(12) United States Patent
Kaminsky et al.

(10) Patent No.: US 11,465,093 B2
(45) Date of Patent: Oct. 11, 2022

(54) COMPLIANT COMPOSITE HEAT EXCHANGERS

(71) Applicant: ExxonMobil Upstream Research Company, Spring, TX (US)

(72) Inventors: Robert D. Kaminsky, Houston, TX (US); Marcel Staedter, Houston, TX (US); Mohsen Shahmirzadi Yeganeh, Newtown, PA (US)

(73) Assignee: ExxonMobil Upstream Research Company, Spring, TX (US)

( * ) Notice: Subject to any disclaimer, the term of this patent is extended or adjusted under 35 U.S.C. 154(b) by 180 days.

(21) Appl. No.: 16/916,948

(22) Filed: Jun. 30, 2020

(65) Prior Publication Data
US 2021/0053006 A1    Feb. 25, 2021

Related U.S. Application Data

(60) Provisional application No. 62/888,679, filed on Aug. 19, 2019.

(51) Int. Cl.
| | | |
|---|---|---|
| *B01D 53/00* | (2006.01) | |
| *F28F 23/00* | (2006.01) | |
| *B01D 5/00* | (2006.01) | |

(52) U.S. Cl.
CPC ......... *B01D 53/002* (2013.01); *B01D 5/0003* (2013.01); *F28F 23/00* (2013.01)

(58) Field of Classification Search
USPC ......................................... 165/104.26; 95/39
See application file for complete search history.

(56) References Cited

U.S. PATENT DOCUMENTS

| | | |
|---|---|---|
| 1,914,337 A | 6/1933 | Belt |
| 1,974,145 A | 9/1934 | Atwell |

(Continued)

FOREIGN PATENT DOCUMENTS

| | | |
|---|---|---|
| CN | 101469262 | 7/2009 |
| CN | 102620523 | 10/2014 |

(Continued)

OTHER PUBLICATIONS

Bach, Wilfried (1990) "Offshore Natural Gas Liquefaction with Nitrogen Cooling—Process Design and Comparison of Coil-Wound and Plate-Fin Heat Exchangers," *Science and Technology Reports*, No. 64, Jan. 1, 1990, pp. 31-37.

(Continued)

*Primary Examiner* — Nina Bhat
(74) *Attorney, Agent, or Firm* — ExxonMobil Upstream Research Company—Law Department

(57) ABSTRACT

A method and apparatus for separating a separation component from a gas stream. One exemplary method includes: flowing the gas stream across a process surface of a compliant composite heat transfer wall, wherein: the gas stream has an initial concentration of the separation component, and the gas stream has a gas temperature; flowing a cooling fluid across a cooling surface of the wall, wherein: the cooling fluid has a fluid temperature, and the fluid temperature is less than the gas temperature; and producing an output gas stream, wherein: the output gas stream has an output concentration of the separation component, and the output concentration is less than the initial concentration. Another exemplary method includes separating at least a portion of the separation component from the gas stream by: accumulating the portion proximate the process surface; and delaminating the portion from the process surface with a flow of the gas stream.

18 Claims, 2 Drawing Sheets

(56) References Cited

U.S. PATENT DOCUMENTS

| | | | |
|---|---|---|---|
| 2,007,271 A | 7/1935 | Frankl | |
| 2,011,550 A | 8/1935 | Hasche | |
| 2,321,262 A | 6/1943 | Taylor | |
| 2,475,255 A | 7/1949 | Rollman | |
| 2,537,045 A | 1/1951 | Garbo | |
| 2,900,797 A | 8/1959 | Kurata et al. | |
| 2,975,604 A | 3/1961 | McMahon | |
| 2,986,010 A | 5/1961 | Beckwith | |
| 3,014,082 A | 12/1961 | Woertz, III | |
| 3,018,632 A | 1/1962 | Keith | |
| 3,103,427 A | 9/1963 | Jennings | |
| 3,180,709 A | 4/1965 | Yendall et al. | |
| 3,347,055 A | 10/1967 | Blanchard et al. | |
| 3,370,435 A | 2/1968 | Arregger | |
| 3,376,709 A | 4/1968 | Dickey et al. | |
| 3,398,544 A | 8/1968 | Crownover | |
| 3,400,512 A | 9/1968 | McKay | |
| 3,400,547 A | 9/1968 | Williams et al. | |
| 3,511,058 A | 5/1970 | Becker | |
| 3,724,225 A | 4/1973 | Mancini et al. | |
| 3,724,226 A | 4/1973 | Pachaly | |
| 3,850,001 A | 11/1974 | Locke | |
| 3,878,689 A | 4/1975 | Grenci | |
| 4,281,518 A | 8/1981 | Muller et al. | |
| 4,415,345 A | 11/1983 | Swallow | |
| 4,533,372 A | 8/1985 | Valencia et al. | |
| 4,604,115 A | 8/1986 | Bonneton et al. | |
| 4,609,388 A | 9/1986 | Adler et al. | |
| 4,669,277 A | 6/1987 | Goldstein | |
| 4,769,054 A | 9/1988 | Steigman | |
| 4,923,493 A | 5/1990 | Valencia et al. | |
| 5,025,860 A | 6/1991 | Mandrin | |
| 5,062,270 A | 11/1991 | Haut et al. | |
| 5,120,338 A | 6/1992 | Potts, Jr. et al. | |
| 5,137,558 A | 8/1992 | Agrawal | |
| 5,139,547 A | 8/1992 | Agrawal et al. | |
| 5,141,543 A | 8/1992 | Agrawal et al. | |
| 5,638,698 A | 6/1997 | Knight et al. | |
| 5,819,555 A * | 10/1998 | Engdahl | F25J 3/0615 62/928 |
| 5,950,453 A | 9/1999 | Bowen et al. | |
| 6,003,603 A | 12/1999 | Breivik et al. | |
| 6,053,007 A | 4/2000 | Victory et al. | |
| 6,082,133 A | 7/2000 | Barclay et al. | |
| 6,158,242 A | 12/2000 | Lu | |
| 6,237,347 B1 | 5/2001 | Rigby et al. | |
| 6,295,838 B1 | 10/2001 | Shah et al. | |
| 6,298,688 B1 | 10/2001 | Brostow et al. | |
| 6,308,531 B1 | 10/2001 | Roberts et al. | |
| 6,412,302 B1 | 7/2002 | Foglietta | |
| 6,662,589 B1 | 12/2003 | Roberts et al. | |
| 6,889,522 B2 | 5/2005 | Prible et al. | |
| 7,143,606 B2 | 12/2006 | Trainer | |
| 7,219,512 B1 | 5/2007 | Wilding et al. | |
| 7,278,281 B2 | 10/2007 | Yang et al. | |
| 7,325,415 B2 | 2/2008 | Amin et al. | |
| 7,386,996 B2 | 6/2008 | Fredheim et al. | |
| 7,520,143 B2 | 4/2009 | Spilsbury | |
| 7,712,331 B2 | 5/2010 | Dee et al. | |
| 8,079,321 B2 | 12/2011 | Balasubramanian | |
| 8,435,403 B2 | 5/2013 | Sapper et al. | |
| 8,464,289 B2 | 6/2013 | Pan | |
| 8,601,833 B2 | 12/2013 | Dee et al. | |
| 8,616,012 B2 | 12/2013 | Duerr et al. | |
| 8,616,021 B2 | 12/2013 | Minta | |
| 8,747,520 B2 | 6/2014 | Bearden et al. | |
| 9,016,088 B2 | 4/2015 | Butts | |
| 9,149,761 B2 | 10/2015 | Northrop et al. | |
| 9,339,752 B2 | 5/2016 | Reddy et al. | |
| 9,435,229 B2 | 9/2016 | Alekseev et al. | |
| 9,439,077 B2 | 9/2016 | Gupta et al. | |
| 9,459,042 B2 | 10/2016 | Chantant et al. | |
| 9,995,521 B2 | 6/2018 | Mogilevsky | |
| 10,294,433 B2 | 5/2019 | Grainger et al. | |
| 10,408,534 B2 * | 9/2019 | Kaminsky | F25J 1/00 |
| 10,465,091 B2 | 11/2019 | Tuteja et al. | |
| 10,696,360 B2 | 6/2020 | Balasubramanian | |
| 10,738,696 B2 * | 8/2020 | Conlon | F02C 7/08 |
| 11,112,173 B2 * | 9/2021 | Mak | F25J 1/0072 |
| 2006/0000615 A1 | 1/2006 | Choi | |
| 2006/0191675 A1 * | 8/2006 | Fletcher | F28F 3/022 165/172 |
| 2007/0277674 A1 | 12/2007 | Hirano et al. | |
| 2008/0087421 A1 | 4/2008 | Kaminsky | |
| 2008/0141714 A1 * | 6/2008 | Cartwright | B01D 53/229 62/619 |
| 2008/0302133 A1 | 12/2008 | Saysset et al. | |
| 2009/0071634 A1 * | 3/2009 | Turner | F28C 3/10 165/104.26 |
| 2009/0217701 A1 | 9/2009 | Minta et al. | |
| 2010/0192626 A1 | 8/2010 | Chantant | |
| 2010/0251763 A1 | 10/2010 | Audun | |
| 2011/0036121 A1 | 2/2011 | Roberts et al. | |
| 2011/0126451 A1 | 6/2011 | Pan et al. | |
| 2011/0259044 A1 | 10/2011 | Baudat et al. | |
| 2012/0060553 A1 | 3/2012 | Bauer | |
| 2012/0180657 A1 | 7/2012 | Monereau et al. | |
| 2012/0227926 A1 * | 9/2012 | Field | F28D 20/02 165/157 |
| 2012/0285196 A1 | 11/2012 | Flinn et al. | |
| 2013/0074541 A1 | 3/2013 | Kaminsky et al. | |
| 2013/0199238 A1 | 8/2013 | Mock et al. | |
| 2014/0130542 A1 | 5/2014 | Brown et al. | |
| 2015/0285553 A1 | 10/2015 | Oelfke et al. | |
| 2017/0010041 A1 | 1/2017 | Pierre, Jr. et al. | |
| 2017/0016667 A1 | 1/2017 | Huntington et al. | |
| 2017/0016668 A1 | 1/2017 | Pierre, Jr. et al. | |
| 2017/0167785 A1 | 6/2017 | Pierre, Jr. et al. | |
| 2017/0167786 A1 | 6/2017 | Pierre, Jr. | |
| 2017/0167787 A1 | 6/2017 | Pierre, Jr. et al. | |
| 2017/0167788 A1 | 6/2017 | Pierre, Jr. et al. | |
| 2018/0215926 A1 | 8/2018 | Gurin et al. | |
| 2018/0231303 A1 | 8/2018 | Pierre, Jr. | |
| 2018/0231305 A1 | 8/2018 | Pierre, Jr. | |
| 2018/0292128 A1 | 10/2018 | Degenstein et al. | |
| 2019/0143255 A1 * | 5/2019 | Kaminsky | F28G 5/00 62/602 |
| 2020/0158449 A1 * | 5/2020 | Kaminsky | B01D 5/0015 |
| 2020/0248871 A1 | 8/2020 | Kaminsky et al. | |
| 2021/0053006 A1 * | 2/2021 | Kaminsky | B01D 5/0003 |
| 2021/0293165 A1 * | 9/2021 | Kaminsky | F01N 3/0205 |

FOREIGN PATENT DOCUMENTS

| | | |
|---|---|---|
| CN | 102628635 | 10/2014 |
| DE | 1960515 | 5/1971 |
| DE | 2354726 | 5/1975 |
| DE | 3149847 | 7/1983 |
| DE | 3622145 | 1/1988 |
| DE | 19906602 | 8/2000 |
| DE | 102013007208 | 10/2014 |
| EP | 1715267 | 10/2006 |
| EP | 1972875 | 9/2008 |
| EP | 2157013 | 8/2009 |
| EP | 2629035 | 8/2013 |
| FR | 2756368 | 5/1998 |
| GB | 1376678 | 12/1974 |
| GB | 1596330 | 8/1981 |
| GB | 2172388 | 9/1986 |
| GB | 2333148 | 7/1999 |
| GB | 2470062 | 11/2010 |
| GB | 2486036 | 11/2012 |
| JP | 59216785 | 12/1984 |
| JP | 2530859 | 4/1997 |
| JP | 5705271 | 11/2013 |
| JP | 5518531 | 6/2014 |
| KR | 2010/0112708 | 10/2010 |
| KR | 2011/0079949 | 7/2011 |
| WO | WO2006/120127 | 11/2006 |
| WO | WO2008/133785 | 11/2008 |
| WO | WO2011/101461 | 8/2011 |
| WO | WO2012/031782 | 3/2012 |
| WO | WO2012/162690 | 11/2012 |

(56) References Cited

FOREIGN PATENT DOCUMENTS

| WO | WO2014/048845 | 4/2014 |
|----|---------------|--------|
| WO | WO2015/110443 | 7/2015 |
| WO | WO2016/060777 | 4/2016 |
| WO | WO2017/011123 | 1/2017 |
| WO | WO2017/067871 | 4/2017 |

OTHER PUBLICATIONS

Chang, Ho-Myung et al, (2019) "Thermodynamic Design of Methane Liquefaction System Based on Reversed-Brayton Cycle" Cryogenics, pp. 226-234.

ConocoPhillips Liquefied Natural Gas Licensing (2017) "Our Technology and Expertise Are Ready to Work Toward Your LNG Future Today," http://lnglicensing.conocophillips.com/Documents/15-1106%20LNG%20Brochure_March2016.pdf, Apr. 25, 2017, 5 pgs.

Danish Technologies Institute (2017) "Project—Ice Bank System with Pulsating and Flexible Heat Exchanger (IPFLEX)," https://www.dti.dk/projects/project-ice-bank-system-with-pulsating-andflexible-heat-exchanger-ipflex/37176.

Diocee, T. S. et al. (2004) "Atlantic LNG Train 4—The Worlds Largest LNG Train", *The 14th International Conference and Exhibition on Liquefied Natural Gas (LNG 14)*, Doha, Qatar, Mar. 21-24, 2004, 15 pgs.

Khoo, C. T. et al. (2009) "Execution of LNG Mega Trains—The Qatargas 2 Experience," *WCG*, 2009, 8 pages.

Laforte, C. et al. (2009) "Tensile, Torsional and Bending Strain at the Adhesive Rupture of an Iced Substrate," *ASME 28th Int'l Conf. on Ocean, Offshore and Arctic Eng.*, OMAE2009-79458, 8 pgs.

McLachlan, Greg (2002) "Efficient Operation of LNG From the Oman LNG Project," *Shell Global Solutions International B.V.*, Jan. 1, 2002, pp. 1-8.

Olsen, Lars et al. (2017).

Ott, C. M. et al. (2015) "Large LNG Trains: Technology Advances to Address Market Challenges", *Gastech*, Singapore, Oct. 27-30, 2015, 10 pgs.

Publication No. 43031 (2000) Research Disclosure, Mason Publications, Hampshire, GB, Feb. 1, 2000, p. 239, XP000969014, ISSN: 0374-4353, paragraphs [0004], [0005] & [0006].

Publication No. 37752 (1995) Research Disclosure, Mason Publications, Hampshire, GB, Sep. 1, 1995, p. 632, XP000536225, ISSN: 0374-4353, 1 page.

Ramshaw, Ian et al. (2009) "The Layout Challenges of Large Scale Floating LNG," *ConocoPhillips Global LNG Collaboration*, 2009, 24 pgs, XP009144486.

Riordan, Frank (1986) "A Deformable Heat Exchanger Separated by a Helicoid," *Journal of Physics A: Mathematical and General*, v. 19.9, pp. 1505-1515.

Roberts, M. J. et al. (2004) "Reducing LNG Capital Cost in Today's Competitive Environment", PS2-6, *The 14th International Conference and Exhibition on Liquefied Natural Gas (LNG 14)*, Doha, Qatar, Mar. 21-24, 2004, 12 pgs.

Shah, Pankaj et al. (2013) "Refrigeration Compressor Driver Selection and Technology Qualification Enhances Value for the Wheatstone Project," *17th Int'l Conf. & Exh. on LNG*, 27 pgs.

Tan, Hongbo et al. (2016) "Proposal and Design of a Natural Gas Liquefaction Process Recovering the Energy Obtained from the Pressure Reducing Stations of High-Pressure Pipelines," *Cryogenics*, Elsevier, Kidlington, GB, v.80, Sep. 22, 2016, pp. 82-90.

Tianbiao, He et al. (2015), Optimal Synthesis of Expansion Liquefaction Cycle for Distributed-Scale LNG, *Institute of Refrigeration and Cryogenics, Shanghai Jiao Tong University*, pp. 268-280.

Tsang, T. P. et al. (2009) "Application of Novel Compressor/Driver Configuration in the Optimized Cascade Process," *2009 Spring Mtg. And Global Conf. on Process Safety—9th Topical Conf. on Gas Utilization*, 2009, Abstract, 1 pg. https://www.aiche.org/conferences/aiche-spring-meeting-and-globalcongress-on-process-safety/2009/proceeding/paper/7a-application-novel-compressordriver-configurationoptimized-cascader-process.

* cited by examiner

COMPLIANT COMPOSITE HEAT EXCHANGERS

CROSS REFERENCE TO RELATED APPLICATIONS

This application claims the priority benefit of U.S. Provisional Patent Application No. 62/888,679, filed Aug. 19, 2019, entitled COMPLIANT COMPOSITE HEAT EXCHANGERS.

FIELD

This disclosure relates generally to the field of hydrocarbon recovery, refinement, and/or reservoir management operations to enable production of subsurface hydrocarbons. Specifically, exemplary embodiments relate to methods and apparatus for chilling a gas stream to separate a separation component (e.g., water, carbon dioxide, hydrogen sulfide) therefrom.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

A typical step during the generation of liquefied natural gas (LNG) is to dry the gas stream to remove water vapor and/or remove carbon dioxide therefrom. These species are the most likely to freeze-out, precipitate, and/or solidify upon cooling natural gas to liquefy it. Solidification may lead to plugging or reduced performance of the liquefaction system and hence is avoided in common practice. Likewise, it is often desired to capture carbon dioxide from flue gas and/or natural gas. Similarly, hydrocarbon recovery, refinement, and/or reservoir management operations include dehydration of a variety of gas streams. A gas stream may be chilled (e.g., with a heat exchanger) to remove water and/or carbon dioxide therefrom, for example by chilling the gas stream below the freezing temperature of the water (0° C. for pure water at atmospheric pressure) or the carbon dioxide (−78° C. for pure carbon dioxide at atmospheric pressure). However, in many applications, the frozen material tends to plug or damage the heat exchanger, which generally includes tight flow passageways. Current means of preventing plugging in the presence of solidification are costly (e.g., via continual scraping of surfaces and/or defrost cycling), especially for large-scale heat exchangers.

Means of reducing plugging include techniques to reduce ice adhesion on heat exchanger surfaces. It is known that ice adhesion is lessened by increased surface flexibility. A common flexible surface material is a rubbery polymer. However, polymers become less flexible at low temperatures. Loss of flexibility tends to be particularly severe at and below the glass transition temperature of the polymer. Moreover, the lowest known glass transition temperatures for polymers are around −100° C., primarily for some silicone polymers. However, −100° C. is insufficient to freeze-out carbon dioxide from typical gas streams (where the carbon dioxide is diluted). For certain polymers, the glass transition temperature may even be too high to allow sufficient removal of water by freezing.

More efficient equipment and techniques to separate one or more separation components (e.g., water, carbon dioxide, hydrogen sulfide) from a gas stream would be beneficial.

SUMMARY

Compliant composite heat exchangers may be utilized to separate components from gas streams. Compliant composite heat exchangers include compliant composite heat transfer walls that maintain process surface flexibility at low temperatures (e.g., below a glass transition temperature of a material of the process surface). Compliant composite heat exchangers may therefore be robust and/or scalable at cryogenic temperatures. As disclosed herein, surface flexibility may be achieved with the use of thin substructures in the material of the process surface wall. The disclosed flexible surface may be coupled with known heat exchanger designs to enable the heat exchangers to work with freezing fluids without rapid plugging or fouling. Embodiments of the present disclosure can thereby be useful in the processing of hydrocarbons from subsurface formations or treating of combustion flue gases to capture and reduce carbon dioxide emissions.

BRIEF DESCRIPTION OF THE DRAWINGS

So that the manner in which the recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of scope, for the disclosure may admit to other equally effective embodiments and applications.

DETAILED DESCRIPTION

Figure 1:
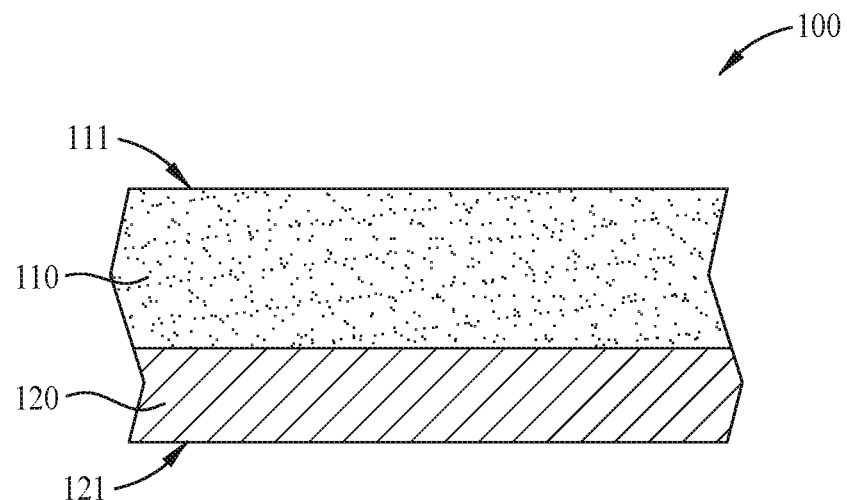
FIG. 1 illustrates an exemplary compliant composite heat transfer wall.

It is to be understood that the present disclosure is not limited to particular devices or methods, which may, of course, vary. It is also to be understood that the terminology used herein is for the purpose of describing particular embodiments only, and is not intended to be limiting. As used herein, the singular forms "a," "an," and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected. The word "exemplary" is used herein to mean "serving as an example, instance, or illustration." Any aspect described herein as "exemplary" is not necessarily to be construed as preferred or advantageous over other aspects. The term "uniform" means substantially equal for each sub-element, within about ±10% variation.

The term "real time" generally refers to the time delay resulting from detecting, sensing, collecting, filtering, amplifying, modulating, processing, and/or transmitting relevant data or attributes from one point (e.g., an event detection/sensing location) to another (e.g., a data monitoring location). In some situations, a time delay from detection of a physical event to observance of the data representing the physical event is insignificant or imperceptible, such that real time approximates instantaneous action. Real time may also refer to longer time delays that are short enough to allow timely use of the data to monitor, control, adjust, or otherwise impact subsequent detections of such physical events.

The term "simultaneous" does not necessarily mean that two or more events occur at precisely the same time or over exactly the same time period. Rather, as used herein, "simultaneous" means that the two or more events occur near in time or during overlapping time periods. For example, the two or more events may be separated by a short time interval that is small compared to the duration of the overall operation. As another example, the two or more events may occur during time periods that overlap by about 40% to about 100% of either period.

As used herein, a "compliant composite heat transfer wall" includes, at least, a flexible layer capable of maintaining flexibility at low temperatures, such as below −100° C. Suitable materials and structures for such flexible layers are further described below. For example, low temperature flexibility may be achieved by forming the flexible layer from thin films or thin fibers with pore space between the films or fibers. As used herein, a "compliant composite heat exchanger" includes a compliant composite heat transfer wall having a flexible layer at or near (as further described below) a process surface (i.e., a surface across which a process fluid flows during normal operation of the compliant composite heat exchanger).

As used herein, "ice" means any species which is solidified from a liquid or gas phase through cooling.

If there is any conflict in the usages of a word or term in this specification and one or more patent or other documents that may be incorporated herein by reference, the definitions that are consistent with this specification should be adopted for the purposes of understanding this disclosure.

One of the many potential advantages of the embodiments of the present disclosure is that heat exchangers and methods of use thereof may become more robust and/or scalable at cryogenic temperatures. Other potential advantages include one or more of the following, among others that will be apparent to the skilled artisan with the benefit of this disclosure: heat exchangers may advantageously include one or more flexible surfaces that remain flexible at cryogenic temperatures; and the disclosed flexible surface may be coupled with known heat exchanger designs to enable the heat exchangers to work with freezing fluids without rapid plugging or fouling. Embodiments of the present disclosure can thereby be useful in the processing of hydrocarbons from subsurface formations or treating of combustion flue gases to capture and reduce carbon dioxide emissions.

Generally, a heat exchanger includes a channel (or a set thereof) for a process fluid, a channel (or a set thereof) for a cooling fluid, and a heat transfer wall between the two channels (or between channels of each of the sets). The process fluid may enter the heat exchanger with substantial concentrations of one or more separation components (e.g., water, carbon dioxide, hydrogen sulfide), and the process fluid may exit the heat exchanger with reduced concentrations of the one or more separation components. For example, the initial concentration of the water in the process fluid may be greater than 0.5 mol %, and/or the initial concentration of the carbon dioxide in the process fluid may be greater than 1.0 mol %. Common types of heat exchangers include shell and tube heat exchangers, plate heat exchangers, plate and shell heat exchangers, and other similar devices. A dynamic scraped surface heat exchanger incorporates an internal mechanism which repeatedly (e.g., periodically) removes fouling from the heat transfer wall. For example, the product-fluid side of the heat transfer wall may be scraped by blades attached to a moving shaft or frame. It should be appreciated that dynamic scraped surface heat exchangers are typically best suited to small scale operations, presenting various mechanical and operational challenges at hydrocarbon-refinement scale operations.

FIG. 1 illustrates an exemplary compliant composite heat transfer wall 100 according to embodiments disclosed herein. The heat transfer wall 100 may be a component of a heat exchanger (e.g., a tube heat exchanger or a plate heat exchanger). The heat transfer wall 100 is composed of a flexible layer 110 and a rigid layer 120. The flexible layer 110 is positioned in a heat exchanger to contact process fluid at surface 111. The rigid layer 120 is positioned in the heat exchanger to contact cooling fluid at surface 121. Heat may thus transfer from the process fluid to the cooling fluid across flexible layer 110 and rigid layer 120. Flexible layer 110 is capable of maintaining flexibility at low temperatures, such as below −100° C. In some embodiments, flexible layer 110 is porous. In some embodiments, rigid layer 120 is impermeable. In some embodiments, rigid layer 120 is made of metal, ceramic, and/or polymer.

Figure 2:
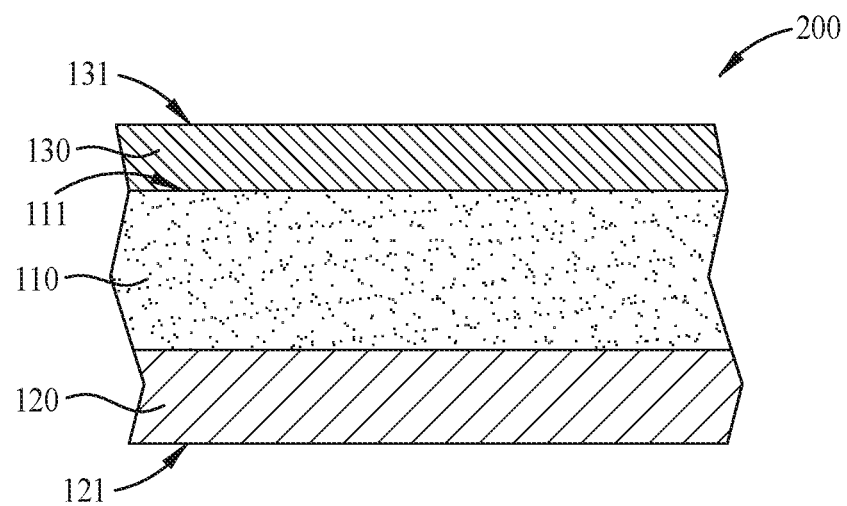
FIG. 2 illustrates another exemplary compliant composite heat transfer wall.

FIG. 2 illustrates another exemplary compliant composite heat transfer wall 200 according to embodiments disclosed herein. Similar to heat transfer wall 100, the heat transfer wall 200 is composed of a flexible layer 110 and a rigid layer 120. Heat transfer wall 200 is also composed of an impermeable layer 130 at least partially covering surface 111 of flexible layer 110. In some embodiments, impermeable layer 130 is a flexible film or foil. In some embodiments, the thickness of the impermeable layer 130 is about 10 µm to about 1 mm. Impermeable layer 130 has a surface 131 that is positioned to contact the process fluid. In some embodiments, the impermeable layer 130 may prevent, or at least mitigate, migration of the process fluid into the flexible layer 110. Impermeable layer 130 may serve as a fluid barrier for flexible layer 110. A low thickness of the impermeable layer 130 may provide high thermal transmissibility and flexibility.

Flexible layer 110 is configured to maintain flexibility at low temperatures. The material of flexible layer 110 may include one or more polymers (e.g., a silicon-based elastomer), one or more metals, a thin substructure, a porous substructure, and/or a composite substructure. For example, the material of flexible layer 110 may be formed of thin (e.g., from about 1.5 µm to about 250 µm thick) substructures, such as fibers, films, foam bubble walls, bristles, etc. It is currently believed that a material, such as a polymer, may be flexible at temperatures below the material's glass transition temperature when the material is arranged in thin substructures. Moreover, the flexibility may improve when the material (or substructures thereof) is free of initiating cracks. For example, some silicone fibers and non-polymeric fibers (e.g., glass fibers, metal fibers, quartz fibers, etc.) are known to be flexible at liquid nitrogen temperatures. Suitable components for flexible layer 110 may be obtained, for example, from NV Bekaert SA or its subsidiaries.

In some embodiments, flexible layer 110 may have a thin substructure that includes fibers, flexible fibers, polymeric fibers, metallic fibers, a film, a flexible film, a foam, a flexible foam, a polymeric foam, a metallic foam, a closed-cell foam, bristles, flexible bristles, and/or any combination thereof. For example, the thin substructure may include a flexible fibrous mass, such as a metal wool, a metallic fibrous mass, or a polymeric fibrous mass. In some embodiments, flexible layer 110 may have a substructure of a flexible foam, such as a metallic foam or a polymeric foam. In some embodiments, the flexible layer 110 may have a substructure of a closed-cell foam to mitigate migration of the process fluid into the foam (to mitigate fouling). In some embodiments, the flexible layer 110 may have a flexible flow barrier proximate surface 111 to mitigate migration of the process fluid into the flexible layer 110. In some embodiments, flexible layer 110 may have a substructure of flexible bristles, such as polymer bristles or metal bristles. In some embodiments, flexible layer 110 may have a substructure of bristles or fibers that are integral with the rigid layer 120 (e.g., generated via surface micromachining). For example, the process surface of a heat transfer wall from a conventional heat exchanger may be micromachined to create bristles or fibers, thereby creating a compliant composite heat transfer wall. In some embodiments, flexible layer 110 may have a substructure that includes two or more types of substructures, such as flexible fibrous masses, flexible foams, closed-cell foams, flexible bristles, and bristles or fibers that are integral with the rigid layer 120.

In some embodiments, flexible layer 110 may have a composite substructure of two or more materials arranged to augment the performance of the flexible layer 110. For example, flexible layer 110 may have a porous substructure, and at least some of the pores may contain a cell fluid (e.g., a liquid or a gel). In some embodiments, the cell fluid may have a freezing temperature selected to be lower than the expected lowest cooling temperature of the heat exchanger. Therefore, the cell fluid may resist compression of flexible layer 110. In some embodiments, the cell fluid may have a low melting temperature, such as below about −90° C. For example, the cell fluid may include methanol, ethanol, and/or 1-propanol. Therefore, the cell fluid may provide incompressible properties of the flexible layer 110, even under high external pressures.

In some embodiments, rigid layer 120 may include a metal (e.g., aluminum or stainless steel allow) to facilitate heat transfer. In some embodiments, rigid layer 120 may include a ceramic and/or a polymer to reduce the weight of the heat exchanger.

In some embodiments, impermeable layer 130 may include a polymeric film. In some embodiments, impermeable layer 130 may include a metal foil. In some embodiments, impermeable layer 130 may include a polytetrafluoroethylene (PTFE) film.

In some embodiments, the material and/or structure of heat transfer wall 100, or portions thereof, may vary along the length of the channel of the heat exchanger (e.g., in the direction of flow of the process fluid). The varying material structure may be selected to provide desired properties of heat transfer wall 100 corresponding to the expected temperature of the process fluid as the process fluid is being cooled. For example, heat transfer wall 100 may be more compliant where expected temperatures are lower than where expected temperatures are higher.

In some embodiments, portions of a heat transfer wall may be a compliant composite heat transfer wall, while other portions (in the same channel) may be a conventional heat transfer wall. For example, one or more portions of the process surface of a heat transfer wall from a conventional heat exchanger may be micromachined to create bristles or fibers, thereby creating a compliant composite heat transfer wall at the micromachined portion(s), while other portions remain a conventional heat transfer wall. It is currently believed that ice or fouling may be more likely to accumulate at the conventional heat transfer wall portions than at the compliant composite heat transfer wall portions (other factors being equal).

Figure 3:
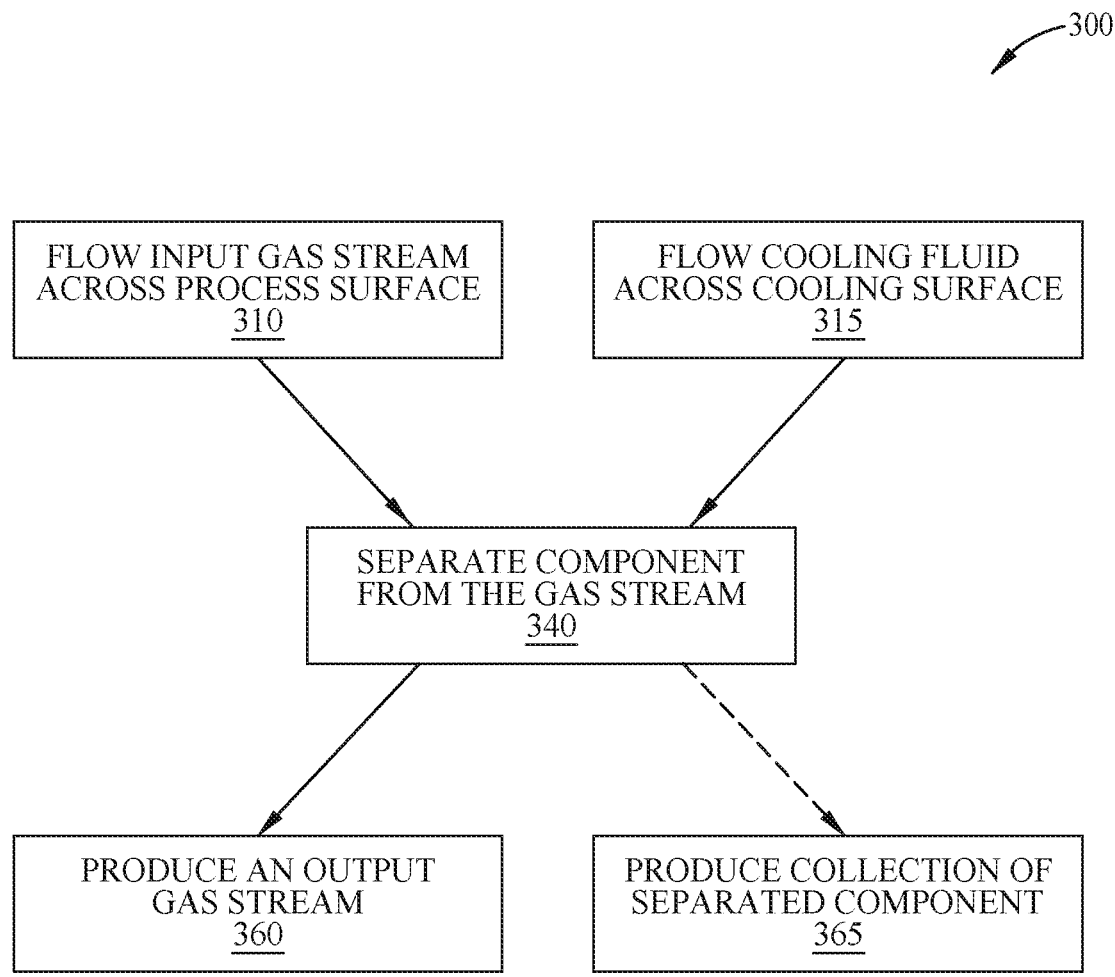
FIG. 3 illustrates a method of separating a separation component from a gas stream utilizing a compliant composite heat exchanger.

A compliant composite heat exchanger, having one or more compliant composite heat transfer walls (or portions thereof), such as heat transfer wall 100 or heat transfer wall 200, may be beneficially used to separate one or more separation components (e.g., water, carbon dioxide, hydrogen sulfide) from a gas stream (e.g., methane and/or a post-combustion exhaust gas). FIG. 3 illustrates a method 300 of separating a separation component from a gas stream utilizing a compliant composite heat exchanger. Method 300 begins at block 310 where an input gas stream is flowed across a process surface (e.g., surface 111, surface 131) of a compliant composite heat transfer wall (e.g., heat transfer wall 100, heat transfer wall 200). The gas stream may initially have a temperature of $GT_i$, a flow rate $GF_i$, and a concentration of the separation component of $C_i$. Simultaneously with the flow of the input gas stream, at block 315 a cooling fluid is flowed across a cooling surface (e.g., surface 121) of the compliant composite heat transfer wall. The cooling fluid may initially have a temperature of $FT_i$, where $FT_i < GT_i$. The temperature of the cooling fluid may be at or below the glass transition temperature of one or more materials of the flexible layer of the compliant composite heat transfer wall.

As the gas stream flows across the process surface and the cooling fluid flows across the cooling surface, heat is transferred from the gas stream to the cooling fluid across the compliant composite heat transfer wall, lowering the temperature of the gas stream to $GT_2$, where $GT_2 < GT_i$. When the temperature of the gas stream reaches the freezing temperature of the separation component, particles of the separation component may form, coalesce, agglomerate, and/or accumulate in the gas stream. The particles may preferentially form at or near the process surface as heat from the gas stream continues to transfer across the compliant composite heat transfer wall. In conventional heat exchangers, an accumulation of the particles creates a layer of ice on the process surface. It is currently believed that the flexible layer (and any impermeable layer thereon) of the compliant composite heat transfer wall will mitigate adhesion of the particles to the process surface. For example, micro-cracks may form and then readily propagate at the ice-flexible surface interface. Therefore, the flow of the gas stream may be sufficient to delaminate any proto ice layer from the process surface of the compliant composite heat transfer wall. For example, detachment of the particles may be achieved either through increased shear stress (due to high flow velocities) and/or through inherent flexibility in the flexible layer (and any impermeable layer thereon) whereby pressure variations between the interior and surface may cause deformation of the surface. For example, stress between a rigid ice sheet and a flexible surface may allow for crack propagation and detachment of the rigid ice sheet.

Method 300 continues at block 340 where the particles of the separation component are separated from the gas stream. For example, the particles may be removed from the gas stream by filtering. In some embodiments, the flow rate of the gas stream across the process surface may be varied to enhance separation of the component. For example, varying the flow rate may create pressure pulses that further delaminate or remove any particle accumulation (e.g., deposited frozen solids) from the process surface. In some embodiments, separation of the separation component is achieved without scraping the compliant composite heat transfer wall or defrost cycling the compliant composite heat exchanger.

In some embodiments, the temperature of the cooling fluid may be varied to enhance separation of the component, and/or to provide for separation of more than one component. For example, temperature cycling may be utilized to intermittently form particles of the separation component, form accumulation of the particles, briefly melt the accumulation to enhance delamination from the process surface, and then repeat the process. As another example, the temperature of the cooling fluid may be varied to form particles of a first separation component having a first freezing temperature, and then to form particles of a second separation component having a second freezing temperature. As another example, the temperature of the cooling fluid may be varied to be intermittently at or below the glass transition temperature of one or more materials of the flexible layer of the compliant composite heat transfer wall. As another example, the temperature of the cooling fluid may be varied above and below the glass transition temperature of one or more materials of the flexible layer of the compliant composite heat transfer wall, while maintaining the fluid temperature below a freezing temperature of the separation component. In some embodiments, the flow rate of the gas stream and the temperature of the cooling fluid may be varied concurrently and/or sequentially to enhance separation of one or more separation components from the gas stream.

Method 300 continues at block 360 where an output gas stream is produced. The output gas stream may have a concentration of the separation component of $C_o$, where $C_o < C_i$. For example, a carbon dioxide concentration of the input gas stream may be about 4%, and a carbon dioxide concentration of the output gas stream may be about 0.4%, as would be appropriate for use with a gas turbine. In some embodiments, the particles of the separation component may be collected and produced as an additional output, as illustrated at block 365 of method 300.

In some embodiments, method 300 of separating a separation component from a gas stream utilizing a compliant composite heat exchanger may be augmented with temperature cycling above and below the glass transition temperature of the flexible layer. The reasoning for the temperature cycling is as follows: ice adhesion may be greatly reduced (in comparison to that of conventional heat exchangers) if the process surface has flexibility, such as from a rubbery polymer. However, polymers become less flexible at low temperatures. Loss of flexibility tends to be particularly severe once the glass transition temperature is reached. However, thermally-efficient removal of ice may be performed if a polymeric surface is heated above its glass transition temperature but below the melting temperature of the ice. Since the glass transition temperature may be, for example, −50° C. or lower, the amount of heat to remove the ice is far less than heating the system to the ice melting temperature (e.g., 0° C. for water ice). Moreover, the latent heat of fusion does not need to be supplied, since no melting occurs. Furthermore, since the temperature cycling range is reduced, the compliant composite heat exchanger experiences less thermal stress due to thermal expansion occurs, and hence improves the lifespan of the system.

Temperature cycling above and below the glass transition temperature of the flexible layer utilizes polymers with glass transition temperatures that are sufficiently low. Specifically, the glass transition—typically concomitant with the drastic change of adhesion properties of solids to the process surface—typically occurs below the melting (or sublimation) temperature of the frozen separation component. More generally, the glass transition temperature may be desired to be as low as possible, even much lower than the melting temperature of the contaminant solid. Low glass transition temperatures may reduce the temperature difference during the temperature cycle, thereby decreasing mechanical stresses and mechanical fatigue failures, and thereby increasing reliability of the heat exchanger. Also, the latent heat of phase change to melt or sublimate the contaminant solid is a parasitic heat flow that reduces the energy efficiency of the system significantly. For example, the sublimation temperature of frozen carbon dioxide at atmospheric pressures is −78.5° C. Therefore, the low glass transition temperature for carbon dioxide removal is below this value. Examples of suitable low temperature plastics include polyethylene (glass transition temperature of about −110° C.) and polyoxymethylene (Acetal) (glass transition temperature of about −60° C.).

The foregoing description is directed to particular example embodiments of the present technological advancement. It will be apparent, however, to one skilled in the art, that many modifications and variations to the embodiments described herein are possible. All such modifications and variations are intended to be within the scope of the present disclosure, as defined in the appended claims.

The invention claimed is:

1. A method for separating gases with a compliant heat exchanger comprising:
    flowing a gas stream across a process surface of a compliant composite heat transfer wall, wherein:
        the gas stream has an initial concentration of a separation component, and
        the gas stream has a gas temperature;
    flowing a cooling fluid across a cooling surface of the compliant composite heat transfer wall, wherein:
        the cooling fluid has a fluid temperature, and
        the fluid temperature is less than the gas temperature; and
    producing an output gas stream, wherein:
        the output gas stream has an output concentration of the separation component, and
        the output concentration is less than the initial concentration.

2. The method of claim 1, wherein the fluid temperature is less than a freezing temperature of at least one component of the gas stream.

3. The method of claim 1, wherein the compliant composite heat transfer wall comprises:
    a flexible layer proximate the process surface; and
    a rigid layer proximate the cooling surface.

4. The method of claim 3, wherein the compliant composite heat transfer wall further comprises an impermeable layer proximate the process surface and at least partially covering the flexible layer.

5. The method of claim 4, wherein the impermeable layer mitigates migration of components of the gas stream into the flexible layer.

6. The method of claim 3, wherein the flexible layer comprises a flexible flow barrier that is proximate the process surface and mitigates migration of components of the gas stream into the flexible layer.

7. The method of claim 1, further comprising:
    collecting at least a portion of the separation component from the gas stream; and
    producing the collected separation component.

8. The method of claim 1, further comprising varying a rate of flow of the gas stream across the process surface.

9. The method of claim 8, wherein varying the rate of flow creates pressure pulses.

10. The method of claim 1, wherein the gas stream comprises carbon dioxide and at least one component selected from the group consisting of
methane;
a post-combustion exhaust gas; and
combinations thereof.

11. The method of claim 1, further comprising varying the fluid temperature while flowing the cooling fluid across the cooling surface.

12. The method of claim 11, wherein:
the compliant composite heat transfer wall comprises a flexible layer proximate the process surface, and
varying the fluid temperature comprises cycling the fluid temperature above and below a glass transition temperature of a material of the flexible layer.

13. The method of claim 12, wherein varying the fluid temperature further comprises maintaining the fluid temperature below a freezing temperature of the separation component.

14. A method for separating a separation component from a gas stream with a compliant composite heat exchanger comprising:
flowing a gas stream across a process surface of a compliant composite heat transfer wall of a compliant composite heat exchanger, wherein:
the gas stream has an initial concentration of the separation component,
the gas stream has a gas temperature, and
the compliant composite heat transfer wall comprises a flexible layer proximate the process surface, the flexible layer comprising a material having a glass transition temperature;
flowing a cooling fluid across a cooling surface of the compliant composite heat transfer wall, wherein:
the cooling fluid has a fluid temperature,
the fluid temperature is less than the gas temperature, and
the fluid temperature is less than the glass transition temperature; and
producing an output gas stream, wherein:
the output gas stream has an output concentration of the separation component, and
the output concentration is less than the initial concentration.

15. The method of claim 14, wherein the fluid temperature is less than a freezing temperature of at least one component of the gas stream.

16. The method of claim 14, wherein the compliant composite heat transfer wall further comprises a rigid layer proximate the cooling surface.

17. The method of claim 14, wherein the compliant composite heat transfer wall further comprises an impermeable layer proximate the process surface and at least partially covering the flexible layer.

18. A method of operating a compliant composite heat exchanger comprising:
flowing a gas stream across a process surface of a compliant composite heat transfer wall of a compliant composite heat exchanger, wherein:
the gas stream has a gas temperature,
the gas stream comprises a separation component having a freezing temperature; and
the compliant composite heat transfer wall comprises a flexible layer proximate the process surface, the flexible layer comprising a material having a glass transition temperature;
flowing a cooling fluid across a cooling surface of the compliant composite heat transfer wall, wherein:
the cooling fluid has a fluid temperature,
the fluid temperature is less than each of:
the gas temperature;
the freezing temperature; and
the glass transition temperature; and
separating at least a portion of the separation component from the gas stream by:
accumulating the portion of the separation component proximate the process surface; and
delaminating the portion from the process surface by flowing the gas stream.

* * * * *